July 13, 1965    A. R. WACKER    3,194,859
PROCESS FOR PRODUCING DECORATIVE SURFACE COVERING
Filed Sept. 2, 1960
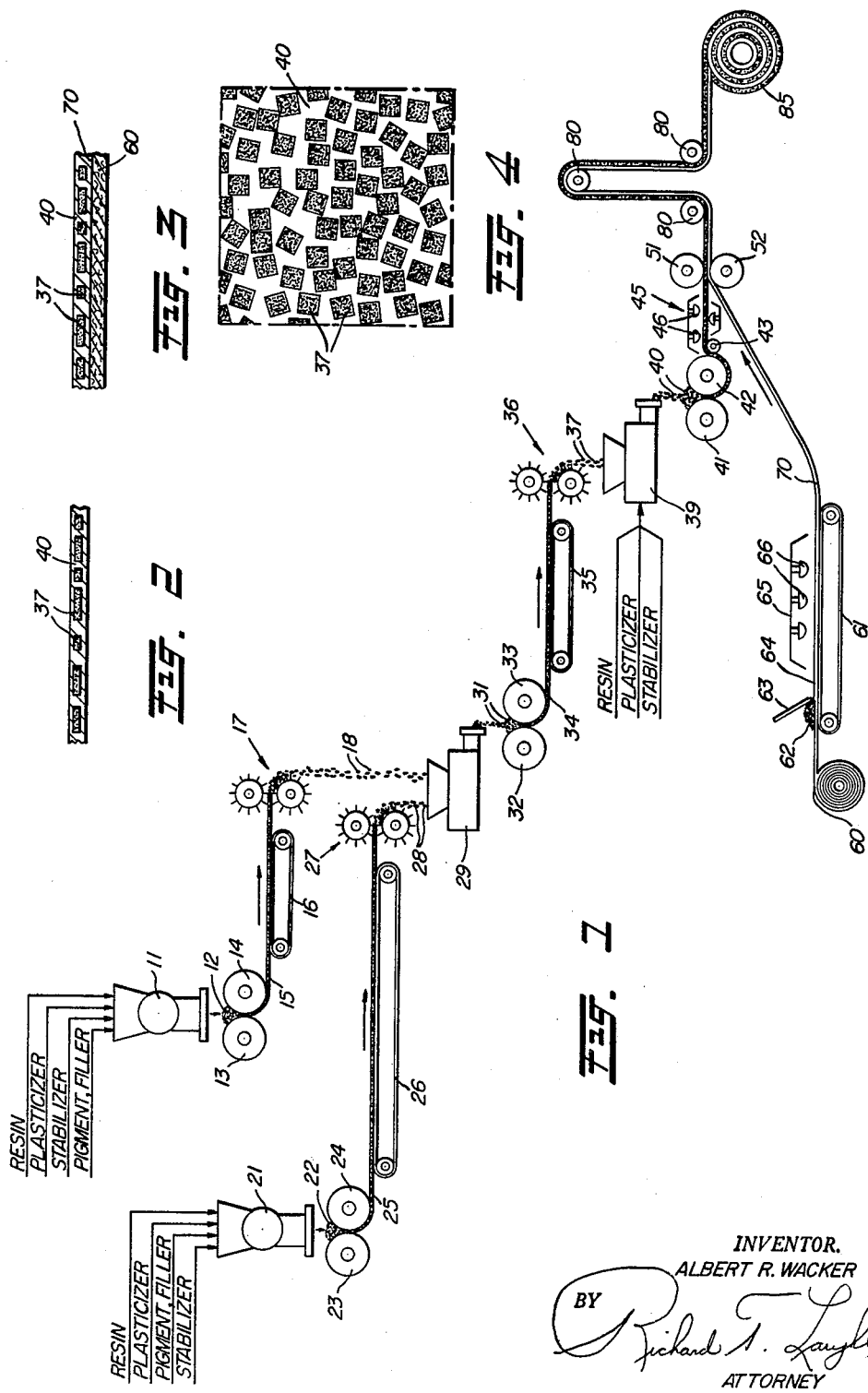
INVENTOR.
ALBERT R. WACKER
BY
ATTORNEY

United States Patent Office 3,194,859
Patented July 13, 1965

3,194,859
PROCESS FOR PRODUCING DECORATIVE SURFACE COVERING
Albert R. Wacker, Churchville, Pa., assignor to Congoleum-Nairn Inc., Kearny, N.J., a corporation of New York
Filed Sept. 2, 1960, Ser. No. 53,711
6 Claims. (Cl. 264—123)

This invention relates to decorative surface coverings for floors, walls and the like and, in particular, to a method of producing such plastic surface coverings.

Plastic surface coverings comprising a resinous binder, stabilizer, filler and colored pigment have come to be widely used as coverings for floors, walls and the like. These products have excellent wearing properties and resistance to attack by household chemicals. These products have been prepared in a wide range of patterns and decorations simulating most of the effects which can be produced with stone flooring materials such as marble and terrazzo. In comparison to stone floorings, they have the advantage of greater resilience which renders them more comfortable under foot. In addition, they do not flake and chip when subjected to sharp impacts which is an undesirable feature of stone floorings.

Soft surface woven and textured carpeting is widely used as a covering for floors and is, therefore, a major source of competition to decorative plastic floor coverings. Although carpeting is soft under foot and has a desirable textured appearance, it does suffer the disadvantage of being difficult to clean. It would be desirable, therefore, to create a three-dimensional effect in a plastic surface covering which would simulate effects heretofore obtainable only in carpeting but which would have a smooth surface which could be easily cleaned. Recently, plastic surface coverings having a translucent appearance have been marketed in an attempt to create such an effect. In the method now in use for producing such plastic surface coverings, granules of translucent or transparent plastic composition are formed and blended with granules of plastic composition pigmented in each of the colors desired in the finished product. This blend is then pressed or molded to produce the finished product.

Plastic surface coverings so prepared have a number of significant disadvantages. Although the product appears to be translucent when held in the hand in front of a light, there is little, if any, three-dimensional effect when the product is installed on the floor. An installation of such products resembles a modified form of a marbleized decoration which has been available for many years. Thus, the desired three-dimensional effect is not apparent in such products. The translucent granules which are blended with the pigmented granules in producing the product are formed from a blend of resinous binder and silica filler since silica has the desired optical properties to impart translucence to a vinyl resinous composition. Silica is a highly abrasive material and preparation of a composition containing silica causes rapid wear of mixing and sheet forming equipment. These products are usually produced in a thickness of 0.125 inch. The reason for producing the product in such a thickness is the necessity of completely eliminating the effect of visibility of the sub-floor through the finished installation. Such a thickness is not necessary for insuring adequate wear resistance and service life of the product since plastic surface coverings having a thickness well below this figure have been in satisfactory service for many years without evidence of failure. Thus, the cost of these products is high. The installation of such products is also a problem and requires the use of expensive light colored resinous adhesives. Dark colored adhesives such as linoleum paste which are widely used in installing other types of floor coverings cannot be used. The reason for requiring the expensive light colored adhesives is that in spite of the thickness of the product, there is a possibility that the adhesive might be visible in the finished installation. Any visibility of a dark colored adhesive would mar the appearance of the installation. Such pigmented adhesives are not altogether satisfactory for hiding the sub-floor. It is necessary to trowel the adhesive onto the floor to form a number of closely spaced ridges of adhesive before installing a plastic floor covering. This is necessary for optimum adhesion of the finished product. By troweling the adhesive, it is impossible to insure complete coverage of the floor. It is apparent that the presence of a transparent area in the product immediately over an uncovered or partially covered area of the sub-floor would create an undesirable appearance to the installation.

A product which is free of many of these disadvantages is disclosed and claimed in United States patent application Ser. No. 706,454, filed December 3, 1957, by Alfred J. Heinrichs, which issued as United States Patent No. 2,987,102, on June 6, 1961. This patent claims a product having a wear layer of transparent and pigmented areas and a backing having a pigmented surface. Portions of the pigmented surface are visible through the wear layer thereby giving the product a three-dimensional appearance.

It is an object of the invention to provide an improved process for producing a decorative plastic surface covering such as claimed in said Heinrichs patent which can be installed upon a surface such as floors, walls and the like having a three-dimensional appearance. Another object of the invention is to provide a process for producing a plastic surface covering having a three-dimensional appearance which can be installed using conventional, inexpensive, dark adhesives. An additional object of the invention is to provide a process for producing a plastic surface covering having an embossed appearance. A still further object of the invention is to provide a continuous process for producing a large variety of decorations in plastic surface covering. Other objects and the advantages of the invention will appear hereinafter.

In accordance with the invention, a decorative plastic surface covering is produced by forming regular or irregular chips of a pigmented composition and admixing the chips with a viscous, sticky liquid mixture of a resinous composition so that all the chips are coated by the liquid composition and thereafter passing the mixture between calender rolls heated to convert the liquid composition to a solid, self-supporting sheet. The sheet is then further heated to completely fuse the resinous composition. The sheet prior to or after fusion can be laminated to a backing. If the resinous composition utilized is at least partially transparent, the chips are clearly visible in the body of the sheet. If a backing material is used having a pigmented surface in contact with the sheet, the finished product has a three-dimensional appearance in that the pigmented surface is visible through the transparent composition between the chips. The surface of the finished product can have an embossed or relief effect in that the area surounding each chip can be slightly depressed caused by the resinous composition not completely filling the area between the chips. The term "transparent" as used herein is also intended to include "translucent" composition in which the chips are visible in the final product.

When using a backing material, strength is important in order that the product withstand the strains occurring both during manufacture and installation. In the case of a flexible resilient product useful as a floor covering, the backing should also have sufficient flexibility to permit the product to be rolled and unrolled without cracking or tearing. Suitable backing sheets include those formed of resinous compositions as well as sheets of impregnated felted fibers. Any of the thermoplastic or elastomeric resinous compositions which can be calendered or pressed to form a flexible sheet can be used to form backing sheets for use in the invention. Such resins as butadiene-styrene copolymer, polymerized chloroprene, polyvinyl chloride, polyvinyl acetate, vinyl chloridevinyl acetate copolymer and the like can be compounded with plasticizers and fillers and sheets to form a flexible sheet. In some cases, scrap and degraded resinous compositions can be salvaged by forming them into sheets which are useful as backing sheets in producing products in accordance with the invention.

Suitable backing sheets also include woven fabrics such as burlap and those formed from cotton, wool and various synthetic fibers. It has been found that felted cellulose fibrous sheets impregnated with a water-proofing and strengthening saturant are highly desirable backings for products prepared in accordance with the invention since they are low in cost and yet are flexible and strong. Numerous fibrous materials can be used in preparing a fibrous backing for use in the invention. In addition to cellulose, other types of fibers can be used including those of animal and mineral origin. The sources of cellulose can include cotton or other rags, wood pulp, paper boxes or mixtures thereof in any proportion. In addition, fillers such as wood flour can be used. A slurry of fibrous material in water is formed into a sheet using any of the techniques conventionally employed in the manufacture of paper. For example, sheet formulation can take place on a Fourdrinier or cylinder paper machine. The fibrous sheet so prepared in then dried.

Felted fibrous sheets for use as backing for surface covering products are normally impregnated with a waterproofing and strengthening impregnant in order to impart improved strength and water resistance to the sheet.

Felted fibrous sheets impregnated with asphalt have been used for many years in the production of surface coverings. Asphalt has the desirable features of being low in cost and of imparting good water resistance to a felt sheet. However, asphalt is a highly thermoplastic material and tends to become soft at temperatures only slightly above normal in the atmospheric temperatures. Thus, in general asphalt is a less satisfactory impregnant for felted fibrous backing sheets useful in the invention. Fibrous sheets impregnated with resinous material are particularly suitable for use as backing sheets in the invention. Suitable resins include vinyl resins, such as polyvinyl chloride, polyvinyl acetate, polymerized vinylidene chloride, mixtures of these with each other, copolymers with each other and with other monomers copolymerizable therewith, polymerized acrylic and methacrylic acids and their polymerized derivatives, polyethylene, polystyrene, butadiene-styrene copolymer, butadiene-acrylonitrile copolymer, natural rubber, polymerized chloroprene and the like. Thermosetting resins which under the influence of heat cure by polymerizing and cross-linking can also be used as impregnants. Such resins as phenolic resins, polyesters, oleoresins such as drying oils and the like, isocyanates and polyurethanes and the like are suitable.

Such resins can be incorporated into a felted fibrous sheet by impregnation of the finished sheet with an emulsion or solution of the resin followed by drying of the sheet to remove the solvent. Alternately, the resin can be added in fine particles to the fiber furnish prior to sheet formation either as solid particles of resin or as an emulsion in water from which fine particles of resin are precipitated onto the fibers.

In accordance with one form of the invention a surface of the backing on which the decorative sheet is formed is provided with a pigmented layer. This layer can be of any color depending on the particular effect desired in the finished product. It has been found particularly effective from the standpoint of cost and ease of application that the pigmented layer be formed on the backing by coating technique. The coating composition comprises a resinous binder, pigment, filler and stabilizer in a liquid dispersion medium. In the coating composition, the ratio of resinous binder to pigment and filler is in the range of about 1:4 to 1.5:1.

The resinous binder used in the coating composition must be one that can be coalesced, fused or cured into a continuous film by the application of heat thereby forming the pigmented layer upon the backing. The resinous binder in the coating composition must be compatible with the decorative sheet as described more fully hereinafter. The method of the invention is adapted to the preparation of both flexible and rigid decorative sheets, but a flexible product is most desirable for use as a resilient surface covering for floors. The preferred resinous binder in the coating composition comprises thermoplastic resinous material since thermoplastic resins are particularly suited to the production of flexible resilient sheets. The thermoplastic resinous binder can be made up solely of thermoplastic resinous material but it normally comprises a mixture of a thermoplastic resin and plasticizer.

Useful thermoplastic resins include polymers and copolymers of acrylic and methacrylic acids and their derivatives, vinyl halogens, polystyrene, polymerized methylstyrene, polybutadiene and the like. Polymers of vinyl chloride have been found particularly effective in the formulation of coating emulsions in the invention. The vinyl chloride polymers can either be simple, unmixed homopolymers of vinyl chloride or copolymers thereof in which the essential polymeric structure of polyvinyl chloride is interspersed at intervals with the residues of other ethylenically unsaturated compounds copolymerized therewith. The essential properties of the polymeric structure of polyvinyl chloride will be retained if not more than 40 percent of another monomer is copolymerized therewith. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, propylene, divinyl ketone and the like.

As already discussed, thermoplastic resinous material can be produced which has satisfactory flexibility at normal temperatures without the presence of plasticizer to be useful as the resinous binder in the coating composition. However, in the case of most of the preferred vinyl chloride polymers, the presence of plasticizer is desirable. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di - (2 - ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffine, alkyd derivatives of rosin and the like. The blend of resin and plasticizer is normally formed within the limits of 15 to 150 parts of plasticizer per 100 parts of resin.

Elastomeric resins such as butadiene-styrene copolymer, butadiene-acrylonitrile copolymer, polymerized chloroprene, natural rubber and the like can also be used as resinous binders in the formulation of coatings for use in the invention. Thermosetting resins can also be used as resinous binders in the coating composition, such as urea-formaldehyde resins, melamine resins, polyesters and the like. The use of coating compositions containing thermosetting resins is restricted to the situation where the decorative composition sheet on the pigmented layer is also thermosetting, the resulting final product after cure being a rigid sheet. When a thermosetting resin is used as the resinous binder in the coating composition, the resin should be in an uncured or partially cured state.

The coating composition also contains fillers and pigments in accordance with the particular background color desired in the finished product. Inert fillers such as silica, both amorphous and crystalline, whiting, talc, clay, pumice, limestone and the like are suitable. Pigments are selected in accordance with the desired color. For example, where a white background is desired, titanium dioxide and zinc oxide either alone or with extenders such as barium sulfate, calcium sulfate, magnesium carbonate, magnesium silicate and the like can be used. For colored background coatings, any of the well-known organic or inorganic pigments can be used in the coating emulsion. In the production of the coating composition in the form of an emulsion, the pigments and fillers are normally ground with water in the presence of wetting agents, thickening agents and the like and the resulting dispersion is mixed with a previously formed emulsion of resinous binder. Formulation is simplified by the fact that emulsions of resinous binders are commercially available and are readily pigmented and filled to form suitable coating emulsions for use in the invention.

The coating composition also contains stabilizers to minimize degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitraniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium and the like, glycerine, leucine, alanine, o- and p-amino benzoic and sulfanilic acids, hexamethylene tetramine, weak acid radicals including oleates, resinoleates, abietates, salicylates and the like. Normally, the composition contains from 0.5 to 5 parts stabilizer per 100 parts resin.

When the coating composition is formulated as an aqueous emulsion, the dispersion is formed in the conventional manner and with conventional ingredients well-known in the latex art. The coating emulsion in general contains about 40 to about 65 percent solids with the balance being water. In addition to the resinous binder, pigment, filler and stabilizer, the emulsion contains conventional wetting agents, thickening agents, antifoam agents, sequestering agents and alkali. Suitable wetting agents include the sodium salt of alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable antifoam agents are pine oils, diglycol laurate, and octyl alcohol. Suitable sequestering agents include tetrasodium pyrophosphate and the tetrasodium salt of ethylenediamine tetra-acetic acid. The alkali provides a pH of about 7.0 so that there will be no tendency for the latex to coagulate. Calcium hydroxide, ammonia, and potassium hydroxide are suitable alkalies for this purpose.

The coating can be applied from different types of liquid compositions. For example, thermoplastic resinous plastisol and organosol coating systems can be used. In this case, the dispersion medium is a plasticizer for the resinous binder in the case of a plastisol and a mixture of plasticizer and volatile organic solvent in the case of an organosol. Since it is desired to obtain a thin dense layer which completely covers and hides the backing, a dispersion containing high percentages of pigment and filler is particularly desirable. For this reason, the aqueous emulsion system is preferred since plastisols and organosols cannot be highly filled without attaining such a high viscosity that coating becomes difficult. Although coating is preferred, since in this way a thin uniform layer can be applied to the backing at minimum cost, the pigmented layer can also be applied as a thin resinous composition sheet formed by calendering or other techniques of sheet formation. Where resinous compositions in sheet form are used as backings, the composition can be pigmented so that the surface upon which the decorative sheet having light transmitting areas is formed has the desired color. This eliminates the necessity of a separate coating step. However, this technique is normally not desirable from a cost standpoint since the entire backing must be pigmented when only the appearance of the surface is important. Thus, this particular technique is wasteful of expensive pigments.

The resinous composition is applied to the backing by any of the conventional techniques well-known in the coating art such as roller coating, doctor blade coating, spray application, brush application and the like. After the coating has been applied to the backing, the sheet is subjected to heat in order to evaporate any volatile components and to set the resinous binder into a flexible uniform film. In the case of an aqueous latex emulsion coating system, the heat treatment step serves to evaporate water in the emulsion. The temperature which the coated layer must attain is dependent on the particular resinous binder used. With the preferred thermoplastic resinous binders, the coating is preferably heated to the fusion temperature of the resin, that is the temperature at which the resin becomes solvated by plasticizer to yield a smooth flexible tough film. Where the thermoplastic resinous binder contains no plasticizer, the coating is heated to a temperature sufficient to soften the resin, thereby causing the minute particles present in the emulsion to coalesce and form a uniform film. Heating to a temperature within the range of about 250° to about 350° F. is usually sufficient to yield a uniform film. A similar heat treatment step is carried out when an elastomeric resinous coating composition is applied to a surface of the backing to yield a pigmented layer thereon. Where the thermosetting resinous binders are used in the coating emulsion, the temperature to which the coating is subjected must be sufficient to evaporate all the water in the emulsion but insufficient to completely cure the resin. Heating can be effected by passing the sheet through a forced hot air oven or radiant heating elements can be placed above the coated surface.

In accordance with one form of the invention, a partially transparent layer of decorative and wear resisting composition is laminated to the pigmented layer on the backing. The wearing surface of the product is partially transparent and, therefore, the pigmented layer is at least partially visible from the surface which creates a three-dimensional effect in the finished product. This effect is caused by the visible thickness of granules, chips, flakes or the like of composition material encased in the resinous composition. The chips of composition are preferably multicolored and of resinous composition, although they can be formed from other material such as metal foil, paper, ceramic compositions or the like. Multicolored chips of resinous composition can be conveniently prepared by mixing separate batches of different colored resinous compositions which are thereafter granulated and the granules admixed in the desired proportions to give the wanted color combination. The mixed granules are then sheeted by any suitable means, such as by passage through calender rolls or extruding and the sheets thus produced converted into the desired geometric shapes. It is preferred that the thickness of the chips, granules or the like be substantially uniform, and therefore, cutting them from a sheet is highly advantageous.

The blend of the chips and liquid resinous composition can be of any desired proportion. Particularly desirable results have been obtained with a blend which contains about 30% to about 90% liquid composition and about 70% to about 10% chips by weight. A range of about 30% to about 60% liquid composition and about 70% to about 40% chips has been found particularly effective.

The thickness of the chips should be from about one-third to about seven-eighths of the thickness of the decorative wear surface layer to be produced and a chip thickness in the range of about one-half to about three-fourths is particularly effective. It is apparent that when using a transparent liquid composition, the relative proportions of clear light-transmitting areas which extend completely through the decorative wear surface layer as compared to the pigmented opaque areas formed from the chips which hide the pigmented layer from view would be appreciably less than the proportions of clear to pigmented composition blended to form the decorative wear surface layer. Such clear light-transmitting areas which extend completely through the thickness of the decorative wear surface would normally represent less than 50% of the surface area of a product and preferably would be in the range of about 5% to about 30% of the surface area of the product. It is apparent, therefore, that the decorative effect created by the product produced in accordance with this form of the invention is largely created by the pigmented chips in the product with the effect of dimension being created by the minor portion of light-transmitting areas which permit the visibility of the pigmented layer. In addition, when thinner chips are used, the multiple layers of chips throughout the thickness of the sheet gives the product an additional three-dimensional appearance.

The liquid resinous composition is prepared by adding resin, plasticizers, stabilizers, pigments, fillers, and the like. The pigment and filler are omitted from the composition if it is desired for the composition to be transparent. If it is desired for the composition to be translucent, a colored pigment can be added to the composition in small quantities. The components are mixed so that the plasticizer disperses the resin thereby forming a flowable viscous composition. The viscosity of the composition is preferably at least $10^6$ centipoises as measured on a Brookfield viscometer using a No. 7 spindle at 2 r.p.m. The viscosity should not be so high as to make dispersion of the chips difficult. It is essential for the viscous liquid to be tacky so that it sticks to the chips. If the liquid does not adhere to the chips, it may be separated from the chips during the calendering. The dispersion grade resins are the most desirable for forming the liquid composition. These resins usually have a particular size ranging from about 0.02 to about 2 microns in diameter. The ratio of plasticizer to resin of the plastisol can be varied to produce the viscosity desired. A ratio of about 1:1 to about 1:4 is highly desirable. The concentration of resin is preferably as high as possible so that the final sheet has high abrasive and stain resistance.

As disclosed above, a resinous binder containing a vinyl chloride polymer or copolymer is particularly effective in formulating the coating composition used in forming the pigmented layer upon a surface of the backing. Thus, the use of such vinyl chloride compositions for the liquid and opaque compositions is particularly effective to insure optimum adhesion between the decorative wearing surface and the pigmented layer thereby promoting excellent resistance to delamination. The resulting product is flexible and resilient which renders it highly desirable as a floor covering. Any of the vinyl chloride polymers disclosed above in connection with the description of the coating composition can be used in the liquid and opaque compositions, that is homopolymers of vinyl chloride and copolymers thereof. Vinyl chloride polymer compositions useful as liquid and opaque compositions in the invention contain as the resinous binder a blend of vinyl chloride polymer and plasticizer. Any of the plasticizers disclosed above in the discussion of the coating composition can be used. There normally is from about 15 to about 150 parts plasticizer per 100 parts vinyl chloride polymer.

Although a vinyl chloride polymer binder is particularly effective in the liquid and opaque compositions for use in the invention, these compositions can also be formed from other thermoplastic resins as well as rubbery elastomeric and thermosetting resins, such as disclosed above in the discussion of the coating composition. The resinous system selected for the liquid and opaque compositions should be compatible with the resin in the pigmented layer to insure maximum adhesion between the pigmented layer and the decorative translucent wear layer. If such compatibility is not present, then it becomes necessary to use an adhesive for securing the layers together. For example, when the pigmented layer is formed of a thermosetting resinous composition, the clear and opaque compositions should also be of the thermosetting resinous type, with the particular resin selected being compatible with the composition of the pigmented layer.

The compositions can also contain small amounts of a release additive in order that the product can be more easily removed from the surface against which the decorative composition is molded to form a smooth uniform sheet. Suitable release additives are waxy substances of both synthetic and natural origin with the vegetable waxes, such as carnauba wax, being particularly effective. Where a release additive is used, the composition normally will contain from 0.2 to 5 parts of release additives per 100 parts resin. The compositions also contain stabilizers to minimize degradation by light and heat, such as disclosed above in the description of the coating composition.

As indicated above, the transparent composition contains resinous binder, stabilizer and a release additive, if desired. It is not highly pigmented and filled. Color can be imparted to the clear composition by the use of small amounts of pigment or organic dye, but the amount used must not be sufficient to impart any appreciable degree of opacity to the composition. The opaque composition differs from the clear composition in that it comprises pigment in an amount sufficient to render the composition opaque. The opaque composition also preferably contains filler in order to reduce the cost of the composition. The opaque composition can contain up to about 80 percent by weight pigment and filler. Pigment is used in order to impart the desired color and opacity to the composition and can be any of the well-known organic or inorganic pigments widely used in the plastic surface covering industry. The opaque composition can also contain inert fillers such as whiting, clay, talc, pumice, limestone and the like.

The size of the pigmented composition chips preferably range in face area from about 0.05 inch in diameter to about 0.5 inch in diameter. The thickness of the chips has been disclosed hereinabove and is preferably from about one-half to about seven-eights of the thickness of the translucent decorative wearing surface created by the sheet-forming step. A chip thickness in the range of one-half to three-fourths the wearing surface thickness is particularly effective. The thickness of the wearing surface of the product is normally in the range of about 0.015 to about 0.080 inch with about 0.040 being the most commonly used.

The pigmented chips and liquid composition are mixed together so that all of the chips are covered with a liquid composition. Sufficient liquid composition has to be used to fill in the voids between the chips. The mixing should be limited as much as possible to prevent undue solvation of the resin in the plasticizer. After mixing, the viscous mass is fed to a pair of calendar rolls. The distance between the calendar rolls is preferably adjusted so that it is greater than the thickness of the chips. In this manner, the viscous composition can be formed into a sheet without substantially distorting the size and shape of the chips. The theory as to why the chips are not distorted is not understood. It is believed, however, that it is due to slippage of the coating over the chips during the calendering since the coating in many instances is sheared completely off the surface of the chips. The calender rolls are so heated as to cause at least partial solvation of the resin thereby converting the liquid mass into a solid, self-supporting sheet containing the chips. The contact time of the composition with the heated calender rolls is of critical importance in that sufficient heat has to be added to the composition to cause the conversion of the liquid to a solid sheet. The sheet is thereafter further heated to completely fuse the composition. When using the preferred composition, the calender rolls are heated between about 225° and about 350° F. and the sheet is subsequently heated to about 300° F. to about 350° F. This heating step can be conveniently carried out in an oven of infrared lamps. Although it is preferred to have the spacing of the calender rolls greater than the thickness of the chips, a wide variety of decorations can be prepared by compressing the chips as they pass through the calender rolls.

The invention will be described with reference to the drawing where

FIGURE 1 is a schematic representation illustrating one embodiment of the method of producing a decorative plastic surface covering in accordance with the invention, FIGURE 2 is a cross-sectional view of a transparent composition formed into a sheet containing the pigmented chips, FIGURE 3 is a cross-sectional view of the sheet of FIGURE 2 with a fibrous backing sheet, and FIGURE 4 is a surface view of one form of the product produced in accordance with the invention.

With reference to FIGURE 1, a supply of resin, plasticizer, pigment, filler and stabilizer is added to a Banbury mixer 11 which is operated at a temperature of 350° F. and in which the ingredients are intimately mixed and blended and the resin becomes fused and solvated by the plasticizer. The fused composition 12 drops from the Banbury mixer into the nip between a pair of heated rotating calender rolls 13, 14 from which a solid color sheet of plastic composition 15 is withdrawn. The sheet is carried by a conveyor belt 16 into a rotary cutting unit 17 in which the sheet is cut into a plurality of chips 18.

A similar supply of resin, plasticizer, stabilizer, filler and different color pigment is fed to a second Banbury mixer 21 operated at a temperature of 350° F. The ingredients are thoroughly and intimately blended in the Banbury mixer and the resin becomes fused and solvated by the plasticizer. The fused composition 22 drops from the second Banbury mixer into the nip between a pair of heated rotating calender rolls 23, 24 between which a pigmented opaque plastic composition sheet 25 is formed. The sheet is carried by a conveyor belt 26 into a second rotary cutting unit 27 wherein the sheet is cut into a plurality of chips 28.

The first pigmented chips 18 and the second pigmented chips 28 drop into a tumbling mixer 29. From the mixer is withdrawn a uniform blend of chips 31 which fall into the nip between a pair of heated rotating calender rolls 32, 33. A two-color sheet 34 having the colors in the form of streaked areas is produced between the calender rolls and the sheet is carried by a conveyor belt 35 into a third rotary cutting unit 36 in which the sheet is cut to form a plurality of chips 37.

A supply of resin, plasticizer and stabilizer is added to a mixer 39 and blended to form a homogeneous mass. The multicolored chips 37 are then added to the mixer 39 and the mixing is continued. The temperature of the mixing is maintained at as low a temperature as possible to prevent a more than partial solvation of the resin and is carried on for just sufficiently long to coat the chips with the liquid composition. The mixture 40 of chips and liquid composition in an unheated state is then fed between calender rolls 41 and 42. The calender rolls are heated to a sufficently high temperature to complete the solvation of the resin. Using the preferred vinyl chloride composition, the calender rolls can be heated to a temperature with about 225° F. to about 350° F. A slight temperature differential of at least 25° is maintained between the rolls and the sheet thus produced tends to follow the cooler of the rolls. The sheet is allowed to remain in contact with the calender roll for as long as possible so as to give it sufficient strength to carry its own weight and to produce a smooth glossy finish. The sheet is then stripped by means of a stripper roll 43 from the calender roll and passed through a heating oven generally indicated at 45 which can be a bank of infrared heat lamps 46. The sheet is heated sufficiently long to completely fuse the composition. The fused sheet is then fed to laminating rolls 51 and 52.

A sheet of impregnated felted cellulose fibers 60 passes onto and is carried by a conveyor belt 61. A mass of liquid pigmented resinous composition 62 is doctored by a doctor blade 63 to provide a thin uniform coating 64 on the upper surface of the felted fibrous sheet 60. The coating is heated by passing beneath an oven 65 which bears a plurality of radiant heating units 66 thereby forming a pigmented layer 70 upon the felt. The coated felt is then fed to the laminating rolls 51 and 52 simultaneously with the semi-transparent decorative sheet which laminates the coated felt to the back of the sheet. The laminating rolls usually comprise a resilient back-up roll 52 and a polished steel roll 51. The rolls are heated to a sufficient temperature to aid in the lamination. The temperature order of 200° to 250° F. has proven particularly effective. The laminated sheet is thereafter passed over cooling rolls 80 and wound on collecting roll 85. The laminating roll contacting the wear surface of the sheet can also be used to planish the surface of the sheet to give it a smoother appearance.

The processing conditions will, of course, vary depending on the particular type of resinous material used. Those skilled in the art of processing resins will be able to select the proper temperature required to yield a tough and durable product. In the case of thermoplastic resins, the composition must become fused. When thermosetting resinous binders are used to form the pigmented layer and the clear and opaque compositions, the product after formation of the decorative wearing surface must be subjected to heat for a time sufficient to cure the thermosetting resins used.

Products produced in accordance with the invention have a smooth and durable wearing surface integrally and firmly bonded to a backing with excellent resistance to delamination. The decorative wearing surface of the product has irregular transparent areas through which the pigmented layer formed on the backing is visible. This imparts a three-dimensional character to the decorative effect.

The following examples are given for purposes of illustration:

Example 1

A coating emulsion having the following composition was prepared:

| | Parts (dry) |
|---|---|
| Geon 576 * (54% solids) | 42 |
| Titanium dioxide dispersion (60% solids) | 15 |
| Calcium carbonate dispersion (60% solids) | 43 |
| | 100 |

*Pre-plasticized polyvinyl chloride copolymer in latex form—B. F. Goodrich Chemical Co., Cleveland, Ohio.

This emulsion was applied to a reverse roller coater to a surface of a sheet of felted cellulose fibers which was impregnated with a mixture of polyvinyl acetate and a petroleum resin having a softening point of 125° F. The coated sheet was dried by exposure to a temperature of 275° F. for 5 minutes to yield a sheet bearing a white pigmented layer upon a surface thereof.

The following composition was fused and mixed in a Banbury mixer at 350° F.:

|  | Parts | Percent by Weight |
| --- | --- | --- |
| Polyvinyl chloride | 100 | 30.9 |
| Dioctyl phthalate | 15 | 4.6 |
| Dipropylene glycol dibenzoate | 18 | 5.6 |
| Calcium Carbonate | 177 | 54.8 |
| Titanium Dioxide | 9 | 2.8 |
| Red Pigment | 1 | 0.3 |
| Stabilizers | 3 | 0.9 |
| Carnauba Wax | 0.3 | 0.1 |
|  |  | 100.0 |

This composition while hot was sheeted between calender rolls to yield an opaque sheet of approximately 0.040 inch in thickness. The sheet was cooled by exposure to the atmosphere and then was comminuted into square chips of approximately ¼ inch on each side.

A plastisol of the following formulation was prepared:

|  | Percent |
| --- | --- |
| Vinyl chloride resin | 58 |
| Epoxidized polyester | 3 |
| Alkyd modified rosin | 15 |
| Mixed diisooctyl and di-n-octyl phthalate | 24 |

The plastisol composition having a viscosity of $2 \times 10^6$ centipoises as measured by a Brookfield viscometer using a No. 7 spindle at 2 r.p.m. was added to a mixer which blended the components into a homogeneous mass. The mass at all times was maintained at a temperature less than 70° F.

The pink chips were uniformly blended in the proportion of 35% by weight of clear plastisol to 65% by weight of pink chips. The composition while at a temperature of approximately 70° F. was fed to two chrome-plated calender rolls. One of the calender rolls was heated to 310° F. and the other calender roll was heated to a temperature of 270° F. The calender rolls were spaced apart to produce a sheet of about 0.050 inch in thickness. The sheet was allowed to remain in contact with the cooler roll for almost a complete revolution of the roll and thereafter stripped from the roll. The rate of sheet production was ten and one-half feet a minute.

The sheet was then fed to a laminator which laminated it to the surface of the coated impregnated felt sheet.

Example 2

The following composition was mixed at 350° F., followed by sheeting and granulating to produce small uniform squares of about ¼ to ½ in. in width and having a thickness of about 30 mils:

|  | Percent |
| --- | --- |
| Resin (copolymer of 97% vinyl chloride and 3% vinyl acetate) | 27 |
| Plasticizer (dioctyl phthalate) | 14 |
| Filler (CaCO₃) | 54 |
| Pigments | 3 |
| Stabilizer | 2 |

A plastisol of the following formulation was prepared:

|  | Percent |
| --- | --- |
| Vinyl chloride resin | 58 |
| Epoxidized polyester | 3 |
| Alkyd modified rosin | 15 |
| Mixed diisooctyl and di-n-octyl phthalate | 24 |

Approximately 500 parts of the plastisol were blended with 1020 grams of granules while maintaining the temperature at about 80° F. The mixture having a viscosity of $1.5 \times 10^6$ centipoises as measured on a Brookfield viscometer using a No. 7 spindle at 2 r.p.m. was then formed into a sheet and laminated to a felt backing following the procedure in Example 1.

Example 3

The procedure of Example 1 was followed, using the following plastisol composition:

|  | Percent |
| --- | --- |
| Polyvinyl chloride resin | 42 |
| Copolymer of vinyl chloride and vinylidene chloride | 14.6 |
| Epoxidized polyester | 3.7 |
| Alkyd modified rosin | 34 |
| Mixed diisooctyl and di-n-octyldecyl phthalate | 3.7 |
| Stabilizer | 2.0 |

Any departure from the foregoing description which conforms to the present invention is intended to be included within the scope of the claims.

What is claimed is:

1. A process for producing a decorative wear resistant resinous composition sheet which comprises mixing thermoplastic decorative chips having a thickness of about one-third to about seven-eighths of the thickness of the final sheet, with a tacky, viscous liquid plastisol comprising a dispersion of fine particles of unfused and unplasticized vinyl resin in a liquid plasticizer and having a viscosity of at least $10^6$ centipoises, to completely coat said chips with said liquid plastisol, passing the mixture of plastisol and chips between calender rolls to form said mixture into a thin film having a thickness corresponding to the distance between said calender rolls, said rolls being heated to a temperature sufficient to at least partially fuse and plasticize said dispersed vinyl resin, allowing said thin liquid film to remain in contact with one of said rolls until the film is converted to a solid, self-supporting sheet, thereafter further heating said sheet to completely fuse and plasticize the dispersed vinyl resin and then cooling the composition sheet thus produced.

2. The process of claim 1 wherein said decorative chips comprise plasticized vinyl chloride polymer composition and said dispersed vinyl resin is a vinyl chloride polymer.

3. The process of claim 1 wherein said rolls are heated to a temperature of about 225° F. to about 350° F.

4. The process of claim 1 wherein said mixture contains about 30 to about 90% by weight of said liquid plastisol.

5. The process of claim 1 wherein said chips have a thickness of about 0.015 to about 0.050 inch and a diameter of about 0.125 to about 0.50 inch.

6. The process of claim 1 wherein said mixing is carried out at a temperature of less than 70° F.

References Cited by the Examiner

UNITED STATES PATENTS

| 2,066,734 | 1/37 | Loetscher. | |
| 2,560,420 | 7/51 | Dodge | 154—49 XR |
| 2,835,620 | 5/58 | Bartlett | 154—49 |
| 2,917,472 | 12/59 | Smith | 260—2.5 |
| 2,987,102 | 6/61 | Heinrichs | 154—49 |
| 3,000,754 | 9/61 | Zentmyer | 154—49 X |
| 3,038,828 | 6/62 | Yakubik | 154—49 |
| 3,056,224 | 10/62 | Almy | 154—49 X |

EARL M. BERGERT, *Primary Examiner.*

CARL F. KRAFT, ALEXANDER WYMAN, JOSEPH REBOLD, *Examiners.*